Jan. 2, 1962     O. G. SCHMIDT     3,015,527
BEARING ASSEMBLY
Filed Nov. 4, 1959
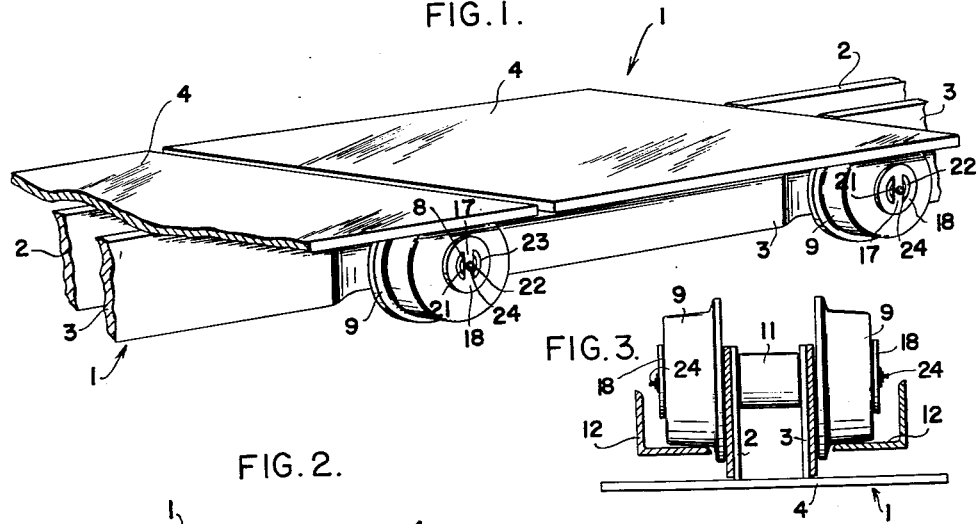
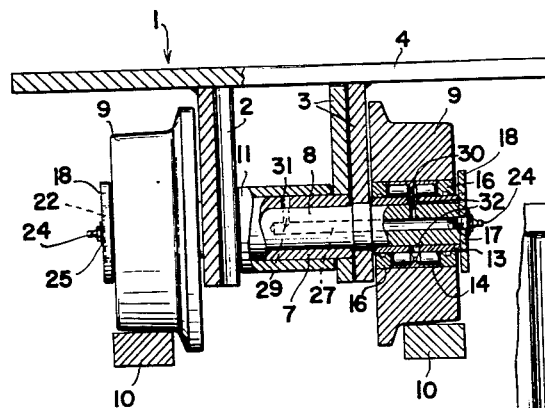
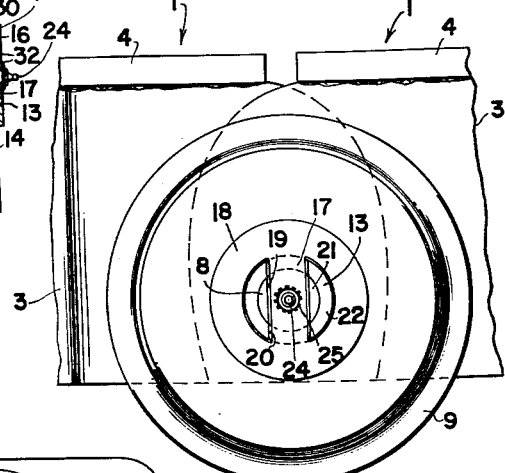
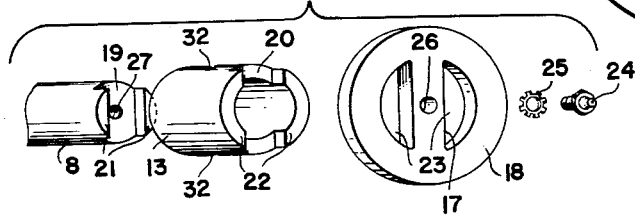
*INVENTOR.*
OLIVER G. SCHMIDT
BY
*Ernest W. Schultz*
ATTORNEY

United States Patent Office 3,015,527
Patented Jan. 2, 1962

3,015,527
BEARING ASSEMBLY
Oliver G. Schmidt, West Allis, Wis., assignor to Chain Belt Company, Milwaukee, Wis., a corporation of Wisconsin
Filed Nov. 4, 1959, Ser. No. 850,898
2 Claims. (Cl. 308—187)

This invention relates to chain conveyors having wheels supporting the chain for movement along a track and particularly to the securement of the wheel and bearing on each projecting end of the chain pins at each side of the chain.

According to the invention, the end thrust bearing comprises a disc or washer provided with symmetrical segmental openings defining a central bar which fits in a slot extending across the ends of the chain pin and inner bearing sleeve. The washer is secured by a grease fitting and is readily removable to allow the disassembly of the roller from the chain.

The washer secures the bearing sleeve against rotation with respect to the chain pin, and indexes the sleeve with respect to the pin so that the grease passages of the pin and bearing are in registry and so that delivery of grease from the fitting to the bearing is assured without failure due to improper assembly of the bearing.

A principal object of the invention is to provide an improved bearing construction having a minimum axial projection and which overlies the bearing seal to project the same and secures the inner bearing sleeve axially and against rotation.

Another object of the invention is to assure the proper indexing of the inner bearing sleeve with respect to the lubricating passages of the chain pin on which the sleeve is assembled.

Other objects and advantages of the invention will appear in the following description of the same as illustrated in the accompanying drawings.

In the drawings:

FIGURE 1 is a perspective view of a part of the chain having rollers adapted to operate on spaced tracks as shown in FIG. 2;

FIG. 2 is a transverse view of the chain with parts thereof broken away and sectioned to show the construction thereof;

FIG. 3 is a reduced cross-section to show the chain operating on return rails in the inverted position;

FIG. 4 is an enlarged side elevation of the roller and bearing assembly; and

FIG. 5 is an isometric view of the non-rotating parts bearing assembly.

Each link 1 of the chain shown in the drawings, includes the spaced, parallel side bars or members 2 and 3 supporting the plate 4 which extends across the bars and is secured thereto. At one end of each link the bars are offset inwardly and such offset portions are connected by the bushings 7 having opposite ends pressed in corresponding holes formed in the bars.

The corresponding straight ends of the bars of each link 1 overlie the offset ends of the bars of the adjacent link and carry the pin 8 which extends through the corresponding bushing 7.

Each pin 8 is secured by means, not shown, against rotation with respect to the side bars or members 2 and 3 through which the pin extends and is rotatable in the respective bushing 7 to permit articulation of the links.

In the operation of the chain, the load is supported on the series of plates 4 and the chain is carried by the wheels 9 operating on the parallel tracks 10. The chain and the load are moved by a drive sprocket, not shown, having teeth adapted to engage the roller 11 which is freely rotatable on each bushing 7. The return run of the chain is inverted as shown in FIG. 3 and is supported by the parallel, flanged rails 12.

The inner and outer races of the bearing of each wheel 9 comprise the sleeves 13 and 14 and the bearing rollers 15 operating therebetween. The outer bearing sleeve 14 is press-fitted in the central axial bore of the respective wheel 9 between the labyrinth-type seal members 16 closing the ends of the bearing. The inner bearing sleeve 13 is mounted on a projecting end of pin 8 of the chain with a relatively loose fit to allow replacement as required. Sleeve 13 is removably secured by the bar 17 of the washer 18 which overlies the outer seal member 16.

Bar 17 fits in the slots 19 and 20 milled in the ends of pin 8 and bearing sleeve 13, respectively, so that rotation of the washer is prevented by pin 8 and rotation of sleeve 13 is prevented by the washer. The projecting portions 21 and 22 of pin 8 and bearing sleeve 13 fit within the segmental openings 23 which are formed in washer 18 and define the bar 17.

Washer 18 is secured to the pin by the grease fitting 24 provided with the lock washer 25 and with a threaded end which extends through the central hole 26 in the washer. Fitting 24 is secured in the threaded end of the central axial bore 27 of pin 8 which forms a passage extending to the radial passages 29 and 30. The hole 31 in bushing 7 is normally disposed in communication with bore 29 for delivery of lubricant from fitting 24 to the roller 11. The opposite radial holes 32 formed in the bearing sleeve 13 are located with respect to projections 22 so that upon assembly of the sleeve on the pin, one of the holes is in registry with the bore 30. Thus, inner bearing sleeve 13 can only be assembled on pin 8 in one of two positions and also the sleeve cannot be reversed end-to-end on the pin.

Washers 18 may be stamped of relatively thin steel plate and are flat so that they do not materially increase the total width of the wheels. They are symmetrical and correctly mounted on the pins in any of the four positions possible. In the assembled bearing, rotation of sleeve 13 is prevented by the washer which also overlies the outer seal member 16 and protects the seal against water spray, dirt, and the like. The axial thrust of the wheels is generally in the direction of the chain side bars, and the washer and grease fitting provides whatever securement of the wheel on the pin is required.

The washers are readily removed and the inner bearing sleeve and washer cannot be mis-assembled. The securement of the inner sleeve is positive and firm and is fully in view for inspection at any time.

Various modes of carrying out the invention are contemplated as within the scope of the following claims, particularly pointing out and distinctly claiming the subject matter which is regarded as the invention.

I claim:

1. In a conveyor chain having projecting pins carrying replaceable bearing sleeves and wheels having bearings including said sleeves for supporting the chain on a track, the ends of each said pin and sleeve having corresponding segmental portions projecting beyond the face of the wheel, a disc having segmental openings to receive said projecting portions of the pin and sleeve and securing the latter thereon and against rotation with respect thereto, a grease-fitting threaded in the end of said pin and extending through a hole in said disc between said openings to secure the disc thereon, said disc being removably secured to the pin by said fitting and having its outer dimensions overlying the face of the wheel to secure the wheel on the sleeve, said pin having a grease-passage from said fitting to the sleeve and said sleeve having opposite openings disposed with respect to said projecting portions so that one or the other of said openings registers with said grease-passage for lubrication of the bearing.

2. In a bearing assembly including a bearing sleeve for rotatably supporting a wheel on a shaft between a member fixed on the shaft and the end of the shaft, said shaft having a central bore for delivery of lubricant from the end of the shaft, said bearing sleeve fitting over said shaft and within said wheel to support the latter, the bore of said shaft and said bearing sleeve having openings which are disposed so as to be in registry when said sleeve is only in either of two positions 180° of each other on the shaft, said sleeve and shaft having a radial slot extending across the corresponding ends thereof, and a disc and a central bar together defining segmental openings on each side of said bar, said bar fitting within said slot with the projecting ends of said shaft and sleeve fitting within said openings, said disc having an outer perimeter overlying the bearing between the sleeve and said wheel and overlying said wheel to retain the latter on the sleeve, said disc also serving to retain the sleeve on the shaft and said bar also serving to allow assembly of said sleeve on the shaft in only either of said two positions, and means fixed in the ends of said bore and removably securing said disc and bar on said shaft.

References Cited in the file of this patent
UNITED STATES PATENTS

| | | |
|---|---|---|
| 1,314,748 | Hoy et al. | Sept. 2, 1919 |
| 1,777,624 | Phillips | Oct. 7, 1930 |

FOREIGN PATENTS

| | | |
|---|---|---|
| 635,757 | France | Jan. 2, 1928 |